United States Patent Office.

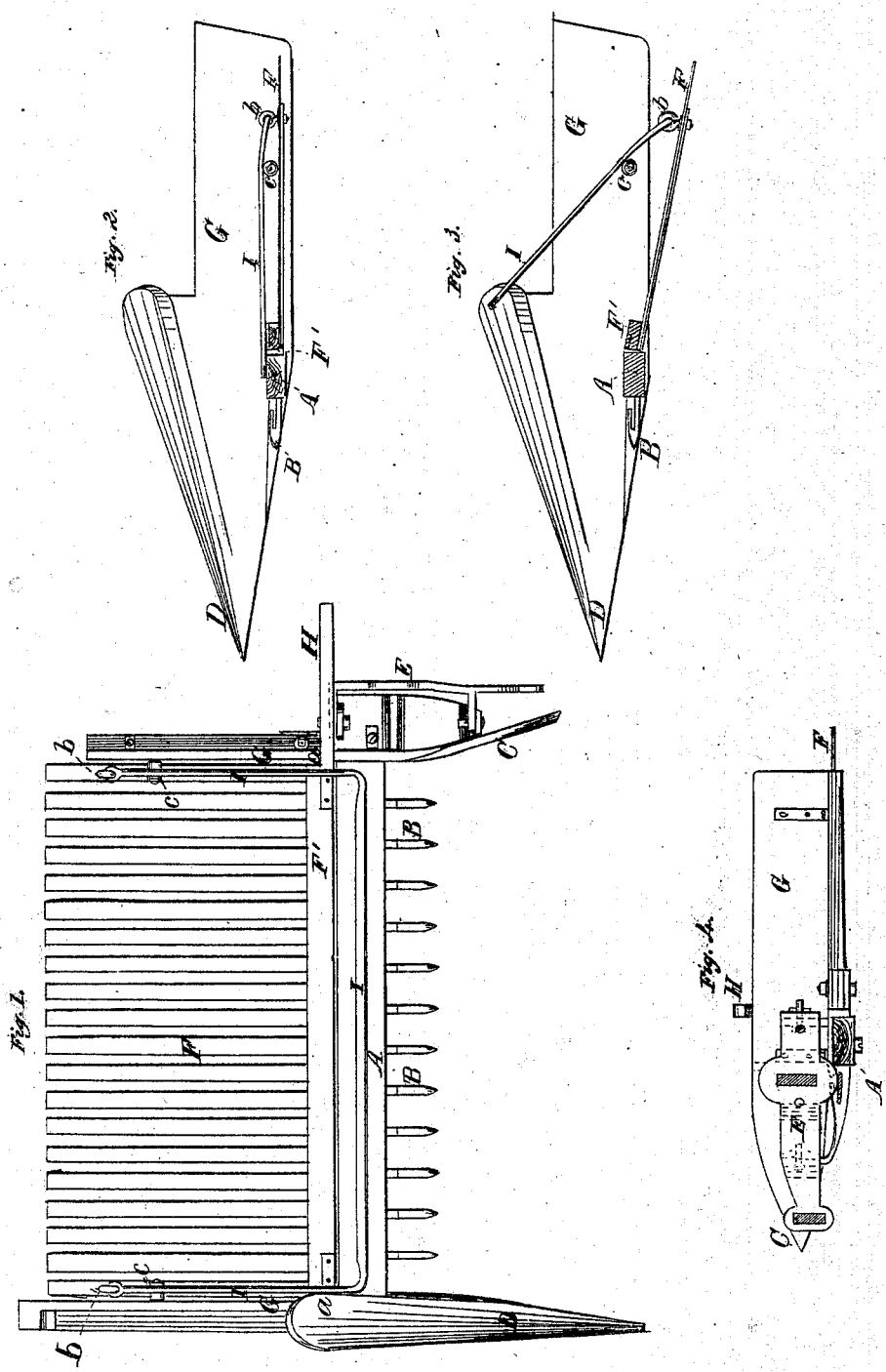

WILLIAM K. MILLER, OF CANTON, OHIO, ASSIGNOR TO C. AULTMAN AND COMPANY, OF THE SAME PLACE.

*Letters Patent No. 68,642, dated September 10, 1867.*

IMPROVEMENT IN HARVESTERS.

*The Schedule referred to in these Letters Patent and making part of the same.*

TO ALL WHOM IT MAY CONCERN:

Be it known that I, WILLIAM K. MILLER, of Canton, in the county of Stark, and State of Ohio, have invented certain new and useful improvements in a Dropping or Delivering Apparatus or Mechanism for Harvesting Machines; and I do hereby declare the following to be a full, clear, and exact description of the same, reference being had to the accompanying drawings, making a part of this specification, in which—

Figure 1 represents a top plan of a grain-table and its several connected parts, together with the mechanism which I have devised for the delivery of the grain therefrom in even gavels.

Figure 2 represents a section through the grain-table from front to rear, and showing the bail down upon the table, and the table itself as in a horizontal position for receiving and holding the cut grain as it falls.

Figure 3 represents a similar section, but showing the bail as raised up to hold the falling grain, whilst the table is dropped to allow that upon it to slide off upon the ground without being dribbled or held by the falling grain.

Figure 4 represents an end elevation of that side of the platform and its several connections next the main frame.

Similar letters of reference, where they occur in the separate figures, denote like parts of the mechanism in all the drawings.

If in delivering the grain from the platform on to the ground, the stalks that are being cut are allowed to fall upon it, they will catch, hold, and tangle it, and thus make uneven gavels.

The object and purpose of my invention is to catch and momentarily hold the falling grain, and keep it separate from that which is to be slid off from the platform on to the ground, and thus prevent tangling of the stalks; and my invention consists in combining with the platform or grain-table of a harvesting machine, a bail-holder, or other equivalent device, that will lie upon the platform whilst enough grain is accumulating there to form a gavel, and then be capable of being raised up to start the gavel, and then catch and hold the grain that is falling until the gavel previously gathered is delivered on to the ground, and, as the platform rises, again fall upon the platform for another similar operation.

To enable others skilled in the art to make and use my invention, I will proceed to describe the same with reference to the drawings.

A may represent the finger-bar of a harvesting machine, to which the fingers or guards B, in which the sickle works, are attached. C is the inside, and D the outside shoe or divider. E is a hinged connection by which the platform and cutting apparatus are united to the main frame. The platform or grain-table F is made of slats, and pivoted at $a\,a$ to the side pieces G G, so that the rear of said platform or grain-table may be let down and raised up by the operator as occasion may require, and for which purpose I have provided a bent lever, H, that is fastened to the platform-beam F', and then extends up and towards the position of the operator, so that he may with his foot let down or raise up the rear of said platform. Towards the rear of the platform, as at $b$, are hinged, at opposite sides thereof, the two ends of what I term a bail, I, and this bail, in extending forward, rests upon fulcra-pins or rollers $c$, set in the side pieces G, which are so united with the respective shoes or dividers and finger-beam as to be firm and stationary therewith. Suppose the bail to be in the position shown in fig. 2, and the machine to be in motion, the stalk will fall upon the platform or grain-table, whilst the butts will rest upon the bail. Now, when sufficient stalks have accumulated to make a gavel, the operator presses upon the lever H, drawing it downward and backward, which drops the rear of the grain-table and allows the stubble to catch and draw off the gavel. At the same instant that the platform drops the bail I rises up, loosening and raising up the butts of the straws and starting them back, and thus allowing the gavel to move off evenly and in good shape. By reversing the pressure of the foot the platform rises at its rear and the bail falls upon it, and both are ready to receive another charge of grain to form another gavel. Whilst the bail is up, which is but for a moment, the falling grain will rest against it, but when it falls then the grain falls also, and this temporary holding of the falling grain and keeping it separate from that which is being slid off from the platform prevents much tangling of the straws.

Having thus fully described the nature, object, and purpose of my invention, what I claim therein as new, and desire to secure by Letters Patent, is—

In combination with the grain-table or platform, the bail I, working in connection therewith, for the purpose and in the manner substantially as herein set forth and described.

W. K. MILLER.

Witnesses:
W. W. CLARK,
J. H. SIDDALL.